United States Patent
Liu

(10) Patent No.: US 8,670,378 B2
(45) Date of Patent: Mar. 11, 2014

(54) TRANSFORM DOMAIN MULTI-USER DETECTION FOR FEMTOCELL

(75) Inventor: Jung-Tao Liu, Saratoga, CA (US)

(73) Assignee: Ablaze Wireless, Inc., San Jose, CA (US)

( * ) Notice: Subject to any disclaimer, the term of this patent is extended or adjusted under 35 U.S.C. 154(b) by 554 days.

(21) Appl. No.: 12/819,622

(22) Filed: Jun. 21, 2010

(65) Prior Publication Data

US 2010/0323713 A1 Dec. 23, 2010

Related U.S. Application Data

(60) Provisional application No. 61/218,954, filed on Jun. 21, 2009.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 8,149,896 B2* | 4/2012 | Filipovic | 375/147 |
| 2003/0165131 A1 | 9/2003 | Liang et al. | |
| 2003/0185165 A1* | 10/2003 | Ishii et al. | 370/317 |
| 2006/0153283 A1* | 7/2006 | Scharf et al. | 375/148 |
| 2008/0212666 A1* | 9/2008 | Kuchi et al. | 375/231 |
| 2008/0293371 A1* | 11/2008 | Kishigami et al. | 455/278.1 |
| 2009/0290661 A1* | 11/2009 | Barriac et al. | 375/343 |

* cited by examiner

*Primary Examiner* — Minh-Trang Nguyen
(74) *Attorney, Agent, or Firm* — Birch, Stewart, Kolasch & Birch, LLP

(57) ABSTRACT

A transform domain multi-user detection and interference suppression apparatus for femtocell is disclosed. The transform domain multi-user detection and interference suppression apparatus is applied in a telecommunication system including a plurality of user equipments. The transform domain multi-user detection and interference suppression apparatus includes a multi-user signal processing module including an interference suppression unit. The multi-user signal processing module receives a plurality of user signals from the plurality of user equipments. During an interference suppression phase, the interference suppression unit of the multi-user signal processing module focuses on one of the plurality of user signals in the transform domain and reduces the other user signals in the transform domain by using a specific operation method. During an interference cancellation phase, the multi-user signal processing module receives an estimation of the plurality of user signals in the transform domain and reconstructs the received signals according to the estimation.

7 Claims, 2 Drawing Sheets

TRANSFORM DOMAIN MULTI-USER DETECTION FOR FEMTOCELL

This application claims priority under 35 U.S.C. 119(e) to U.S. Provisional Application No. 61/218,954 filed on Jun. 21, 2009, of which are hereby expressly incorporated by reference into the present application.

BACKGROUND OF THE INVENTION

1. Field of the Invention

The present invention relates to a telecommunication system, and more particularly, to a multi-user detection and interference suppression apparatus for femtocell.

2. Description of the Prior Art

In recent years, many novel data communication technologies for the telecommunication system have been developed, such as code division multiple access (CDMA), frequency division multiple access (FDMA), and orthogonal frequency-division multiplexing (OFDM).

CDMA is a channel access method utilized by various radio communication technologies. One of the basic concepts in data communication is the idea of allowing several transmitters to send information simultaneously over a single communication channel. This allows several users to share a bandwidth of different frequencies. This concept is called multiplexing. CDMA employs a spread-spectrum technology and a special coding scheme (where each transmitter is assigned a code) to allow multiple users to be multiplexed over the same physical channel.

FDMA is a channel access method used in multiple-access protocols as a channelization protocol. FDMA gives users an individual allocation of one or several frequency bands, or channels. Multiple access systems coordinate access between multiple users. The users may also share access via different methods such as TDMA, CDMA, or SDMA. These protocols are utilized differently, at different levels of the theoretical OSI model.

OFDM is a frequency-division multiplexing (FDM) scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme at a low symbol rate, maintaining total data rates similar to conventional single-carrier modulation schemes in the same bandwidth.

No matter CDMA, FDMA, or OFDM technology is used in the telecommunication system, since multiple user signals from different users are received by the conventional RAKE receiver, a step of multi-user detection is very important and indispensable. However, in practical applications, multi-user detection is notorious for its complexity when it is applied at the basestation (e.g., femtocell). And, interferences occurred among the multiple user signals are so serious that the bit-error-rate (BER) performance and the block-error-rate (BLER) performance of the conventional RAKE receiver become very poor. And, these poor performances of the conventional RAKE receiver should be improved to enhance the communication quality of the telecommunication system.

SUMMARY OF THE INVENTION

Therefore, the invention provides a transform domain multi-user detection and interference suppression apparatus for femtocell to solve the aforementioned problems.

A first embodiment of the transform domain multi-user detection and interference suppression apparatus of the invention is a transform domain CDMA multi-user linear interference suppression/cancellation receiver. In this embodiment, the CDMA transform domain multi-user linear interference suppression/cancellation receiver includes a transform domain multi-user signal processing module, and the transform domain multi-user signal processing module includes an interference suppression unit. The transform domain multi-user signal processing module receives a plurality of user signals from a plurality of user equipments.

During an interference suppression phase, the transform domain multi-user signal processing module focuses on one of the plurality of user signals in the transform domain and reduces the other user signals by using a specific operation method. During an interference cancellation phase, the transform domain multi-user signal processing module receives an estimation of the user signals and reconstructs the received signals according to the estimation.

In practical applications, the specific operation method can be a signal subspace method, a minimum mean-square-error method, a minimum noise level method, or a minimum signal-to-noise method; the estimation of the user signals in the transform domain can be transmitted from a demodulation/user detection module or a despreading module of the CDMA multi-user linear interference suppression/cancellation receiver; the estimation can include an estimated multi-path channel profile or a user signal energy.

A second embodiment of the transform domain multi-user detection and interference suppression apparatus of the invention is a CDMA/OFDM dual mode transform domain multi-user interference suppression/cancellation receiver. In this embodiment, the CDMA/OFDM dual mode multi-user interference suppression/cancellation receiver includes a multi-user transform domain signal processing module, a CDMA channel estimation module, and an OFDM channel estimation module; the transform domain multi-user signal processing module includes an transform domain interference suppression unit. The multi-user signal processing module receives a plurality of user signals from a plurality of user equipments and judges whether the user signal received is a CDMA signal or an OFDM signal.

If the received user signal is the CDMA signal, the CDMA channel estimation module will perform channel estimations based on pilots and/or detected data. And then, the transform domain multi-user signal processing module will extract a wanted signal from the user signals via a signal extracting method in the transform domain.

If the received user signal is the OFDM signal, the OFDM channel estimation module will perform channel estimations based on pilots and/or detected data in the transform domain. And then, the transform domain multi-user signal processing module will extract a wanted signal from the user signals via a signal extracting method in the transform domain.

In practical applications, the above-mentioned transform domain signal extracting method can be a signal equalization method, an interference suppression method, or an interference cancellation method.

Compared to the prior arts, the transform domain multi-user detection and interference suppression apparatus of the invention is suitable for both CDMA and OFDM and can greatly improve the bit-error-rate (BER) and the block-error-rate (BLER) performance over the conventional RAKE based receivers which is designed for CDMA only and cannot be used for OFDM. Therefore, the transform domain multi-user detection and interference suppression apparatus of the invention can largely enhance the communication quality of the telecommunication system.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides a transform domain multi-user detection and interference suppression apparatus suitable for both CDMA and OFDM which can greatly improve the bit-error-rate (BER) and the block-error-rate (BLER) performance over the conventional RAKE based receivers.

Figure 1:
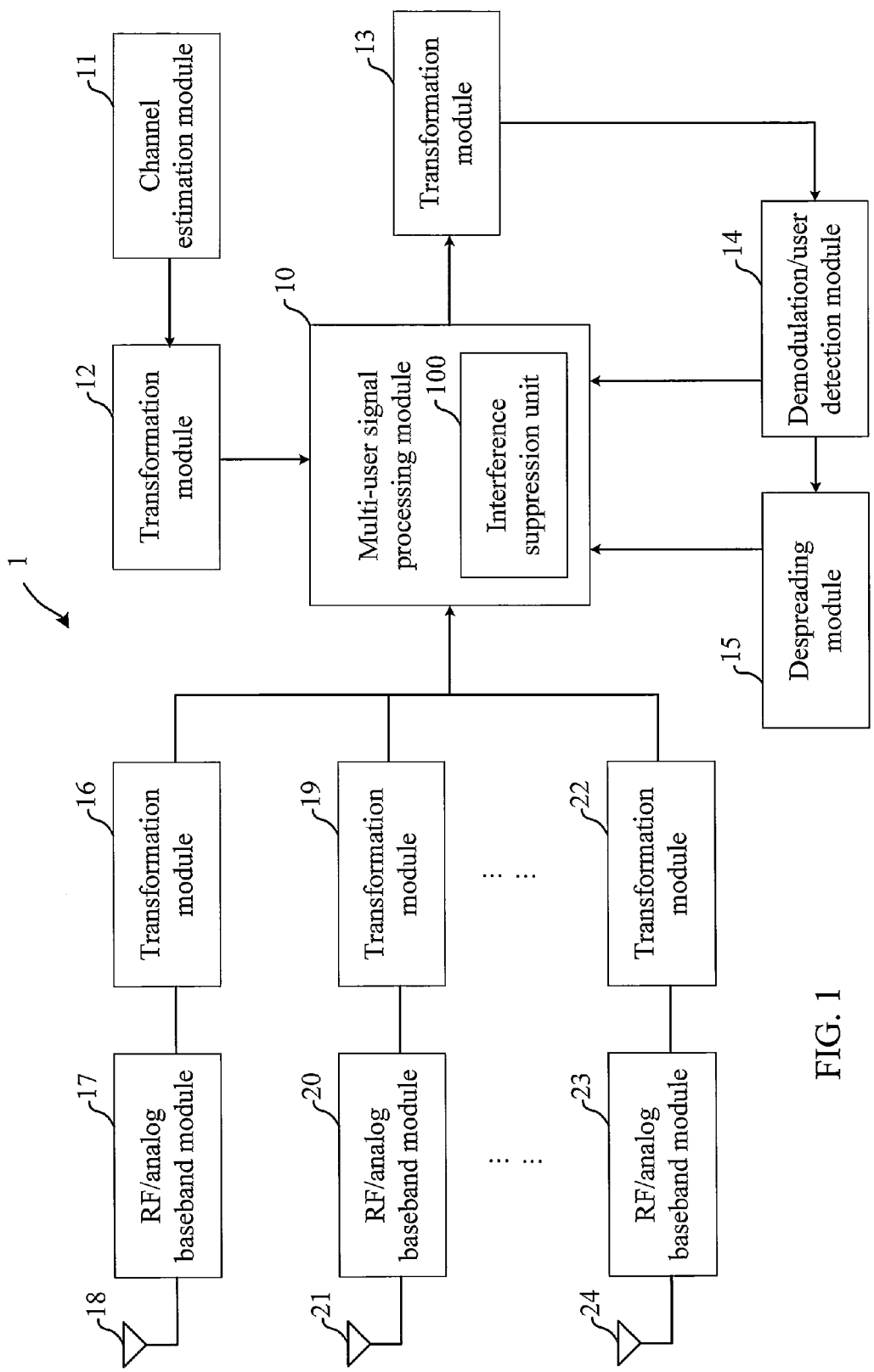
FIG. 1 illustrates a functional block diagram of the CDMA transform domain multi-user linear interference suppression/cancellation receiver in the first embodiment.

A first embodiment of the invention is a CDMA transform domain multi-user linear interference suppression/cancellation receiver. Please refer to FIG. 1. FIG. 1 illustrates a functional block diagram of the CDMA transform domain multi-user linear interference suppression/cancellation receiver.

As shown in FIG. 1, the CDMA transform domain multi-user linear interference suppression/cancellation receiver 1 includes a multi-user signal processing module 10, a channel estimation module 11, transformation modules 12, 13, 16, 19, and 22, a demodulation/user detection module 14, a despreading module 15, RF/analog baseband modules 17, 20, and 23, and antennas 18, 21, and 24. It should be noticed that the multi-user signal processing module 10 includes an interference suppression unit 100, and the numbers of RF/analog baseband modules and antennas are not limited by this embodiment. That is to say, the numbers of the user signals and the users have no limitations.

In this embodiment, the RF/analog baseband module 17 is coupled between the transformation module 16 and the antenna 18; the RF/analog baseband module 20 is coupled between the transformation module 19 and the antenna 21; the RF/analog baseband module 23 is coupled between the transformation module 22 and the antenna 24; the transformation modules 16, 19, and 22 are all coupled to the multi-user signal processing module 10; the transformation module 12 is coupled between the multi-user signal processing module 10 and the channel estimation module 11; the transformation module 13 is coupled between the multi-user signal processing module 10 and the demodulation/user detection module 14; the demodulation/user detection module 14 is coupled to the multi-user signal processing module 10 and the despreading module 15; the despreading module 15 is coupled to the multi-user signal processing module 10.

In the CDMA transform domain multi-user linear interference suppression/cancellation receiver 1, the channel estimation module 11 is used to estimate the distortion condition of the user signals and provide these channel information to the transform domain multi-user signal processing module 10; the transformation modules 12, 13, 16, 19, and 22 are used to transform the user signals into specific signal spaces. Since the most important module of the CDMA transform domain multi-user linear interference suppression/cancellation receiver 1 is the transform domain multi-user signal processing module 10, then the transform domain multi-user signal processing module 10 will be introduced in detail as follows.

In this embodiment, the transform domain multi-user signal processing module 10 takes into account of the signal strengths, multi-path fading profiles of the signals from all the users, and from all antenna data streams to extra user data streams in the transform domain from the overall received signal by suppressing, cancelling, compensating other user's signals in the transform domain. In fact, the users include both handsets and basestations. It should be noticed that the output of the multi-user signal processing module 10 consists of multiple data streams in the transform domain, and each of the data streams corresponds to one of the users in the transform domain.

Since the transform domain multi-user signal processing module 10 includes the interference suppression unit 100, therefore, during an interference suppression phase, the multi-user signal processing module 10 focuses on only one user signal in the transform domain of a user and reduces other user signals of other users by using different techniques such as signal subspace, minimum mean square error, minimum noise level, and/or minimum signal-to-noise, etc, in the transform domain.

Not only the interference suppression phase, the transform domain multi-user signal processing module 10 can be also operated under an interference cancellation phase. During the interference cancellation phase, the transform domain multi-user signal processing module 10 will receive estimations of the user signals from the demodulation/user detection module 14 or the despreading module 15. And then, the transform domain multi-user signal processing module 10 will start to reconstruct the received signals in the transform domain by using the estimated multi-path channel profile or the user signal energy in the transform domain. Therefore, the CDMA multi-user linear interference suppression/cancellation receiver 1 can greatly improve the BER and the BLER performance over the conventional RAKE based receivers.

Figure 2:
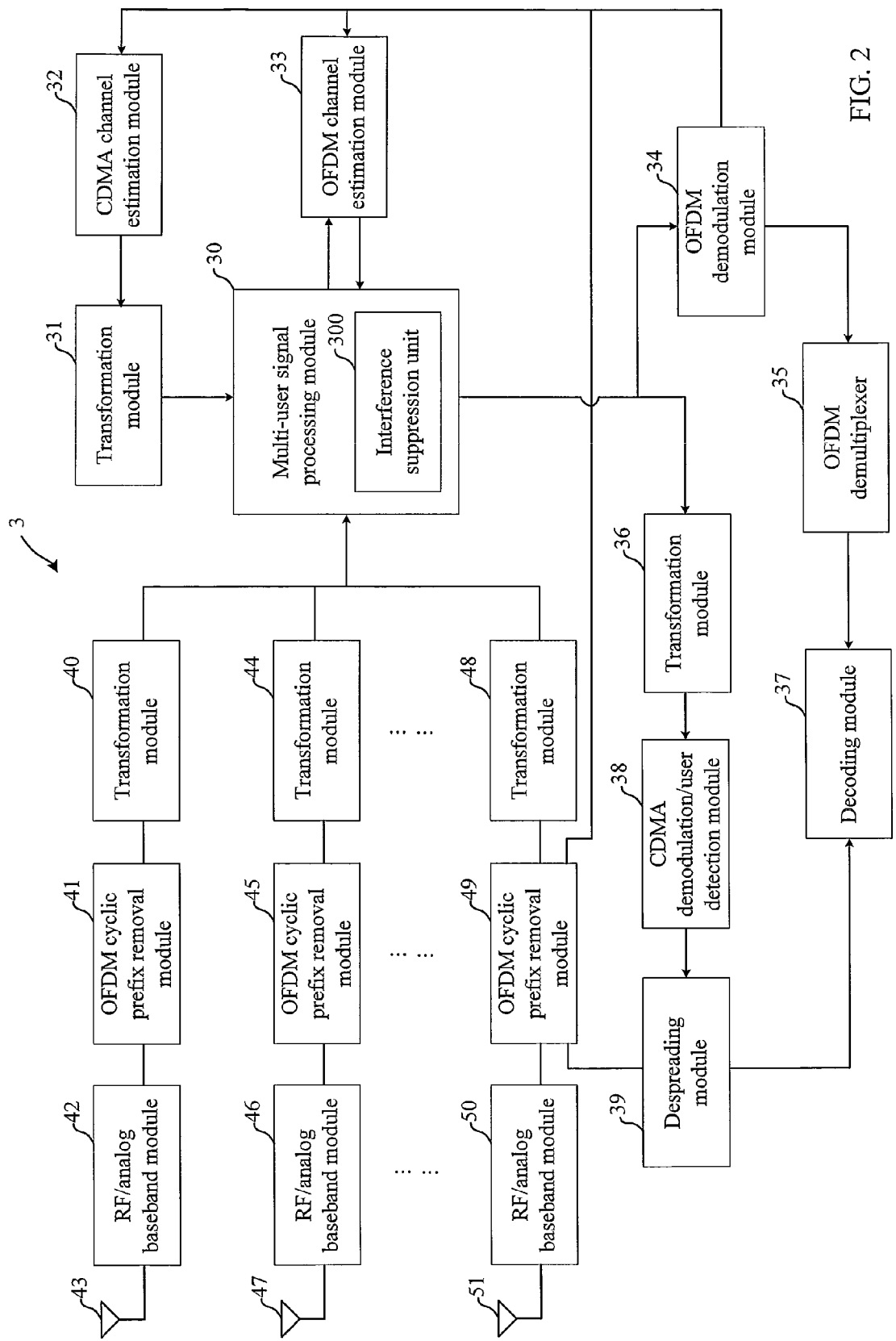
FIG. 2 illustrates a functional block diagram of the CDMA/OFDM dual mode transform domain multi-user interference suppression/cancellation receiver in the second embodiment.

A second embodiment of the invention is a CDMA/OFDM dual mode transform domain multi-user interference suppression/cancellation receiver. Please refer to FIG. 2. FIG. 2 illustrates a functional block diagram of the CDMA/OFDM dual mode transform domain multi-user interference suppression/cancellation receiver.

As shown in FIG. 2, the CDMA/OFDM dual mode transform domain multi-user interference suppression/cancellation receiver 3 includes a transform domain multi-user signal processing module 30, transformation modules 31, 36, 40, 44, and 48, a CDMA channel estimation module 32, an OFDM channel estimation module 33, an OFDM demodulation module 34, an OFDM demultiplexer 35, a decoding module 37, a CDMA demodulation/user detection module 38, a despreading module 39, OFDM cyclic prefix removal modules 41, 45, and 49, RF/analog baseband modules 42, 46, and 50, and antennas 43, 47, and 51. And, the transform domain multi-user signal processing module 30 includes an interference suppression unit 300.

In this embodiment, the RF/analog baseband module 42 is coupled between the OFDM cyclic prefix removal module 41 and the antenna 43, and the OFDM cyclic prefix removal module 41 is coupled to the transformation module 40; the RF/analog baseband module 46 is coupled between the OFDM cyclic prefix removal module 45 and the antenna 47, and the OFDM cyclic prefix removal module 45 is coupled to the transformation module 44; the RF/analog baseband module 50 is coupled between the OFDM cyclic prefix removal module 49 and the antenna 51, and the OFDM cyclic prefix removal module 49 is coupled to the transformation module 48 and the despreading module 39.

It should be noticed that the transformation modules 40, 44, and 48 are all coupled to the transform domain multi-user signal processing module 30; the CDMA channel estimation module 32 is coupled to the transformation module 31; the transformation module 31 is coupled to the multi-user signal processing module 30; the multi-user signal processing module 30 is coupled to the OFDM channel estimation module 33, the OFDM demodulation module 34, and the transformation module 36 respectively; the OFDM channel estimation module 33 is coupled to the multi-user signal processing module 30; the OFDM demodulation module 34 is coupled to the CDMA channel estimation module 32, the OFDM channel estimation module 33, and the OFDM demultiplexer 35 respectively; the OFDM demultiplexer 35 is coupled to the decoding module 37; the despreading module 39 is coupled to the decoding module 37; the transformation module 36 is coupled to the CDMA demodulation/user detection module 38; the CDMA demodulation/user detection module 38 is coupled to the despreading module 39.

In this embodiment, the CDMA/OFDM dual mode transform domain multi-user interference suppression/cancellation receiver 3 will perform frame synchronization with the known sequence depending on the signal. Then, the CDMA/OFDM dual mode transform domain multi-user interference suppression/cancellation receiver 3 performs timing synchronization and frequency offset estimation respectively. If the received signal is CDMA signal, the CDMA channel estimation module 32 will perform channel estimations based on pilots and/or detected data and then transformation module 31 will perform signal transformation. And then, the multi-user signal processing module 30 will perform signal equalization, interference suppression, interference cancellation, and other ways of extracting wanted signal in the transform domain. After the signal is transformed by the transformation module 36, the signal will be demodulated by the CDMA demodulation/user detection module 38 and de-multiplexed by the despreading module 39. At last, the signal will be decoded by the decoding module 37. In fact, the decoding module 37 can be a de-interleaving module or a de-puncturing module to perform a de-interleaving or de-puncturing process.

If the signal is OFDM signal, the OFDM channel estimation module 33 will perform channel estimations based on pilots and/or detected data, and then the multi-user signal processing module 30 will perform signal equalization, interference suppression, interference cancellation, and other ways of extracting wanted signal. And then, the OFDM demodulation module 34 will perform demodulation on the signal and the OFDM demultiplexer 35 will perform demultiplexing on the signal. At last, the signal will be decoded by the decoding module 37. In fact, the decoding module 37 can be the de-interleaving module or de-puncturing module to perform the de-interleaving or de-puncturing process.

In practical applications, the above-mentioned dual-mode receiver 3 can also process both LTE (SC-FDMA) and CDMA signals at the same time. The dual-mode receiver 3 performs frame synchronization with the known sequence depending on the signal. And then, the dual-mode receiver 3 performs timing synchronization and frequency offset estimation respectively.

If the signal is CDMA signal, the dual-mode receiver 3 will perform channel estimations based on pilots and/or detected data and then perform signal transformation. And then, the dual-mode receiver 3 will perform signal equalization, interference suppression, interference cancellation, and other ways of extracting wanted signal. After the signal is transformed by the dual-mode receiver 3, the signal will be demodulated and de-multiplexed by the dual-mode receiver 3. At last, the signal will be decoded by the dual-mode receiver 3.

If the signal is LTE (SC-FDMA) signal, the dual-mode receiver 3 will perform channel estimations based on pilots and/or detected data, and then the dual-mode receiver 3 will perform signal equalization, interference suppression, interference cancellation, and other ways of extracting wanted signal. And then, the dual-mode receiver 3 will perform demodulation on the signal and demultiplexing on the signal. At last, the signal will be decoded by the dual-mode receiver 3.

Compared to the prior arts, the transform domain multi-user detection and interference suppression apparatus of the invention is suitable for CDMA, OFDM and SC-FDMA and can greatly improve the bit-error-rate (BER) and the block-error-rate (BLER) performance over the conventional RAKE based receivers which can only process the CDMA signals but not the OFDM/SC-FDMA signals. Therefore, the transform domain multi-user detection and interference suppression apparatus of the invention can largely enhance the communication quality of the telecommunication system.

Although the present invention has been illustrated and described with reference to the preferred embodiment thereof, it should be understood that it is in no way limited to the details of such embodiment but is capable of numerous modifications within the scope of the appended claims.

What is claimed is:

1. A transform domain multi-user detection apparatus, applied in a telecommunication system, the telecommunication system comprising a plurality of user equipments, the transform domain multi-user detection apparatus comprising:

a transform domain multi-user signal processing module, the multi-user signal processing module receiving a plurality of user signals from the plurality of user equipments and judging whether a user signal of the plurality of user signals received is a CDMA signal or an OFDM and/or SC-FDMA signal;

a CDMA channel estimation module, coupled to the multi-user signal processing module; and an OFDM and/or SC-FDMA channel estimation module, coupled to the multi-user signal processing module;

wherein if the received user signal is the CDMA signal, the CDMA channel estimation module performs a CDMA channel estimation; if the received user signal is the OFDM and/or SC-FDMA signal, the OFDM and/or SC-FDMA channel estimation module performs a OFDM and/or SC-FDMA channel estimation, and then the multi-user signal processing module extracts a wanted signal in the transform domain from the plurality of user signals in the transform domain via a signal extracting method.

2. The transform domain multi-user detection apparatus of claim 1, wherein the signal extracting method is a signal equalization method in the transform domain.

3. The transform domain multi-user detection apparatus of claim 1, further comprising an antenna, a RF/analog baseband module, an OFDM and/or SC-FDMA cyclic prefix removal module, and a transformation module, wherein the received user signal is received by the antenna and then processed by the RF/analog baseband module and the OFDM and/or SC-FDMA cyclic prefix removal module, and transformed by the transformation module.

4. The transform domain multi-user detection apparatus of claim 1, further comprising an OFDM and/or SC-FDMA demodulation module and an OFDM and/or SC-FDMA demultiplexer, wherein the OFDM and/or SC-FDMA demodulation module is coupled between the multi-user signal processing module and the OFDM and/or SC-FDMA demultiplexer, the OFDM and/or SC-FDMA demodulation module and the OFDM and/or SC-FDMA demultiplexer perform demodulation and demultiplexing on the OFDM and/or SC-FDMA signal respectively.

5. The transform domain multi-user detection apparatus of claim 4, further comprising a decoding module/de-interleaving module/de-puncturing module coupled to the OFDM and/or SC-FDMA demultiplexer, wherein the decoding module/de-interleaving module/de-puncturing module decodes/de-interleaves/de-punctures the demodulated and demultiplexed OFDM and/or SC-FDMA signal.

6. The transform domain multi-user detection apparatus of claim 1, further comprising a transformation module coupled between the multi-user signal processing module and the CDMA channel estimation module, wherein the transformation module performs a transformation on the CDMA channel estimation and transmits the transformed CDMA channel estimation to the multi-user signal processing module.

7. The transform domain multi-user detection apparatus of claim 1, wherein the transform domain multi-user detection apparatus is a CDMA/OFDM/SC-FDMA multi-mode transform domain multi-user receiver.

\* \* \* \* \*